(12) United States Patent
Wang et al.

(10) Patent No.: US 9,730,067 B2
(45) Date of Patent: Aug. 8, 2017

(54) VERIFICATION IN WIRELESS LOCAL AREA NETWORK

(75) Inventors: Ju Wang, Beijing (CN); Hao Wang, Beijing (CN); Tao Lin, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 605 days.

(21) Appl. No.: 13/900,538

(22) PCT Filed: Dec. 22, 2011

(86) PCT No.: PCT/CN2011/084459
§ 371 (c)(1),
(2), (4) Date: May 23, 2013

(87) PCT Pub. No.: WO2012/103771
PCT Pub. Date: Aug. 9, 2012

(65) Prior Publication Data
US 2013/0269000 A1    Oct. 10, 2013

(30) Foreign Application Priority Data

Feb. 1, 2011  (CN) .......................... 2011 1 0034707

(51) Int. Cl.
*H04W 12/08* (2009.01)
*H04L 29/06* (2006.01)

(52) U.S. Cl.
CPC ........... *H04W 12/08* (2013.01); *H04L 63/126* (2013.01)

(58) Field of Classification Search
CPC ....... H04W 8/26; H04W 80/04; H04W 84/12; H04L 61/2015; H04L 2012/2841
USPC ......................................... 726/4, 13; 713/168
See application file for complete search history.

(56) References Cited

U.S. PATENT DOCUMENTS

2007/0177530 A1*  8/2007  Ando et al. ................... 370/277
2011/0119737 A1*  5/2011  Wen et al. ......................... 726/3

FOREIGN PATENT DOCUMENTS

| CN | 101895587 | 11/2010 |
| CN | 102158866 | 8/2011 |
| WO | 2007/137518 | 12/2007 |
| WO | 2008/022821 | 2/2008 |

OTHER PUBLICATIONS

CN First Office Action dated Jun. 6, 2012 issued on CN Patent Application No. 201110034707.0 filed on Feb. 1, 2011, The State Intellectual Property Office, the P.R. China.
CN Non-First Office Action dated Feb. 27, 2013 issued on CN Patent Application No. 201110034707.0 filed on Feb. 1, 2011, The State Intellectual Property Office, the P.R. China.
(Continued)

*Primary Examiner* — Dao Ho
(74) *Attorney, Agent, or Firm* — Hewlett Packard Enterprise Patent Department

(57) ABSTRACT

A verification method or apparatus applied in a Wireless Local Area Network (WLAN) includes learning an Internet Protocol (IP) address assigned to a station; sending the IP address to a managing device that is managing the access device and receiving, from the managing device, a determination of whether the IP address is used by another station; and verifying a data packet sent by the station by using an IP address that is not used by another station as reported by the managing device.

20 Claims, 9 Drawing Sheets

(56) References Cited

OTHER PUBLICATIONS

International Search Report and Written Opinion dated Mar. 29, 2012 issued on PCT Patent Application No. PCT/CN2011/084459 filed on Dec. 22, 2011, The State Intellectual Property Office, the P.R. China.
Wu, J. et al., "A Source Address Validation Architecture Testbed and Deployment Experience", IETF RFC5210, Jun. 30, 2008, p. 6 line 18-p. 9 line 14.

* cited by examiner

| MAC address | User information |
|---|---|
| MAC1 | |
| MAC2 | |
| . . . | |
| MACn | |

| MAC address | User information | | |
|---|---|---|---|
| MAC1 | IP address | Extended field | |
| | IP11 | Ready Lifetime 1 | |
| | IP12 | Ready Lifetime 2 | |
| | First lifetime table | | |
| MAC2 | | | |
| ⋮ | | | |
| MACn | | | |

Figure 4b

| MAC address | User information | | |
|---|---|---|---|
| MAC1 | IP address | Extended field | First IP address table |
| | IP11 | Ready lifetime 1 | |
| | IP12 | Ready lifetime 2 | |
| | First lifetime table | | |
| MAC2 | | | |
| ⋮ | | | |
| MACn | | | |

Figure 4c

VERIFICATION IN WIRELESS LOCAL AREA NETWORK

The present application is a 371 application of International Application No. PCT/CN2011/084459 filed on Dec. 22, 2011 and entitled "Verification in Wireless Local Area Network," which claims the benefit of Chinese Patent Application No. 201110034707.0 filed on Feb. 1, 2011.

BACKGROUND

Compared to a wired local area network (LAN), a Wireless Local Area Network (WLAN) technology can be relatively simple to start-up and implement and has relatively low maintenance costs. One service that may be provided a WLAN is to allow a wireless user can connect to a fixed network or the Internet. Some WLANs also allow secure network access and may allow a wireless user to roam between different access points. One issue with WLANs is ensuring that a wireless user authorized to use the WLAN.

BRIEF DESCRIPTION OF THE DRAWINGS

The accompanying drawings illustrate various examples of the principles described herein and are a part of the specification. The illustrations are merely examples and do not limit the scope of the claims.

FIG. 3c is a flowchart illustrating roaming of a station in an example of the principles disclosed herein.

FIGS. 4a to 4c are schematic diagrams illustrating a user information table in accordance with another example of the principles disclosed herein.

DETAILED DESCRIPTION

When a data packet is received by the Wireless Local Area Network (WLAN), the packet may be verified to confirm that it is authorized for transmission within and use by the WLAN. One way of verifying the packet is source MAC address verification. In the source MAC address verification, an access device that receives a data packet, e.g. an Access Point (AP), determines whether to forward the received data packet by verifying whether the source MAC address in the received data packet is valid. However, there has been no Internet Protocol (IP) address verification in the WLAN. This may result in different stations using the same IP address, and thus affecting network security.

Figure 1:
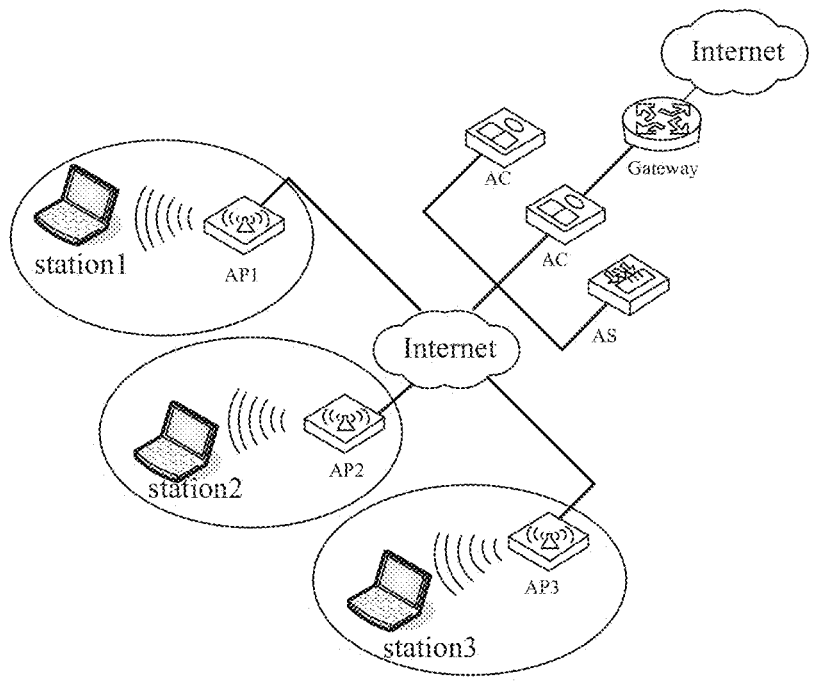
FIG. 1 is a schematic diagram illustrating a structure of a WLAN in which can be practiced the principles disclosed herein.

A WLAN shown in FIG. 1 is taken as an example. In FIG. 1, three mobile devices, illustrated as stations 1-3, wirelessly access a network, that includes access to the Internet, through three respective access points (APs 1-3). An address assignment server, e.g. a DHCP (Dynamic Host Configuration Protocol) server, assigns an IP address to each device accessing the network, e.g., station 1 accessing the network via AP 1.

In this example, station 2, which is accessing the network through a second access points, i.e., AP2, may seek to counterfeit or masquerade as station 1. Consequently, station 2 sends a Dynamic Host Configuration Protocol (DHCP) v6 confirm packet carrying the IP address assigned to station 1 to the address assignment server. The transmission and acknowledgment of the DHCP v6 confirm packet is a legal DHCP interaction process in which the device assigned an IP addresses sends the DHCP v6 confirm packet when coming on line again, so as to confirm the IP address assigned to that device. After receiving the DHCP v6 confirm packet, the address assignment server only verifies whether an identification (ID) of the device, e.g., station 1, carried in the DHCP v6 confirm packet is identical with an ID of the device or station recorded by the address assignment server to which that IP address was assigned.

Because station 2 seeks to appears as station 1 in this scenario and sends the DHCP v6 confirm packet, the correct ID of station 1 is provided in the packet to ensure that the address assignment server will allow station 2 to use the IP address assigned to station 1. In this way, when the verification is passed, different stations use the same IP address to perform communication at the same time, and thus affect network security.

To prevent this and similar scenarios, the present specification discloses methods for verifying packets and device access in addition to verification using the source MAC address in the WLAN.

Figure 2:
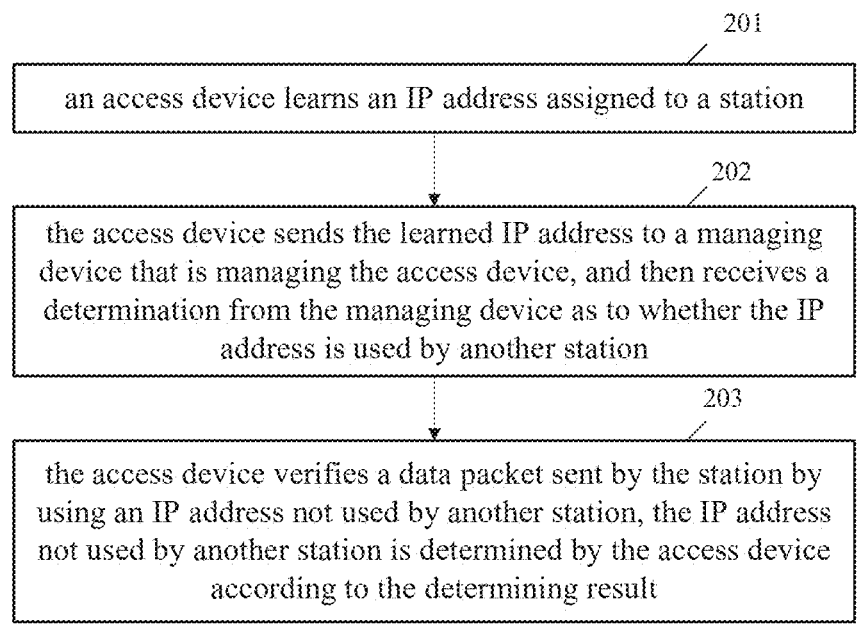
FIG. 2 is a basic flowchart illustrating an example of the principles disclosed herein.

FIG. 2 is a basic flowchart illustrating an example. As shown in FIG. 2, the procedure includes the following block.

Block 201, an access device learns an IP address assigned to a station.

Block 202, the access device sends the learned IP address to a managing device that is managing the access device and the access device then receives a determination from the managing device as to whether the IP address is used by another station.

The way in which it is determined whether the IP address is used by another station will be described below.

Block 203, the access device verifies a data packet sent by the station by using an IP address not used by another station, the IP address not used by another station is determined by the access device according to the determining result.

Figure 3A:
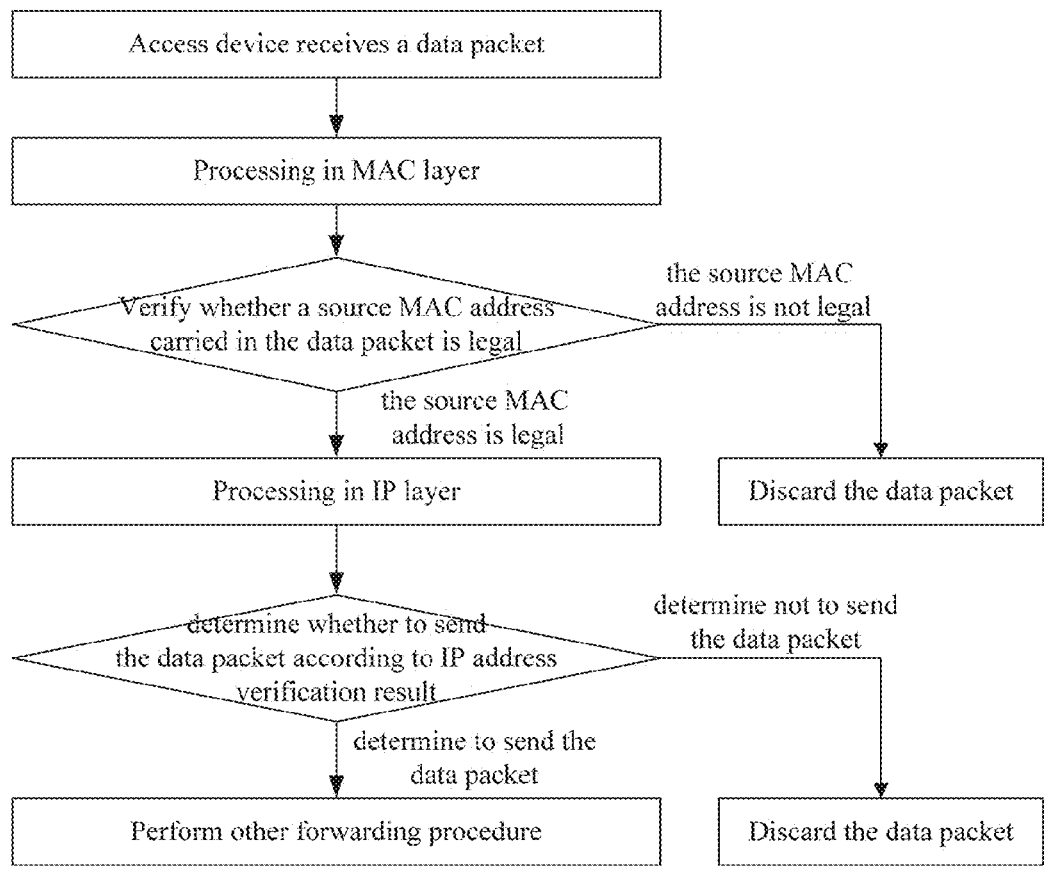
FIG. 3a is a schematic diagram illustrating verification in an example of the principles disclosed herein.

It should be noted that, the verification in block 203 may be performed after the data packet has passed MAC address verification. One example of a method of MAC address verification is shown in FIG. 3a.

In the procedure shown in FIG. 2, the access device may be an AR Correspondingly, the managing device may be an Access Controller (AC).

The stations in block 202 belong to the same link. As can be seen from blocks 201 to 203, in this example, the data packet sent by the station is verified by using an IP address that is not used by another station belonging to the same link as the station seeking verification. This avoids different stations belonging to the same link performing communication by using the same IP address and promotes network security.

Figure 3B:
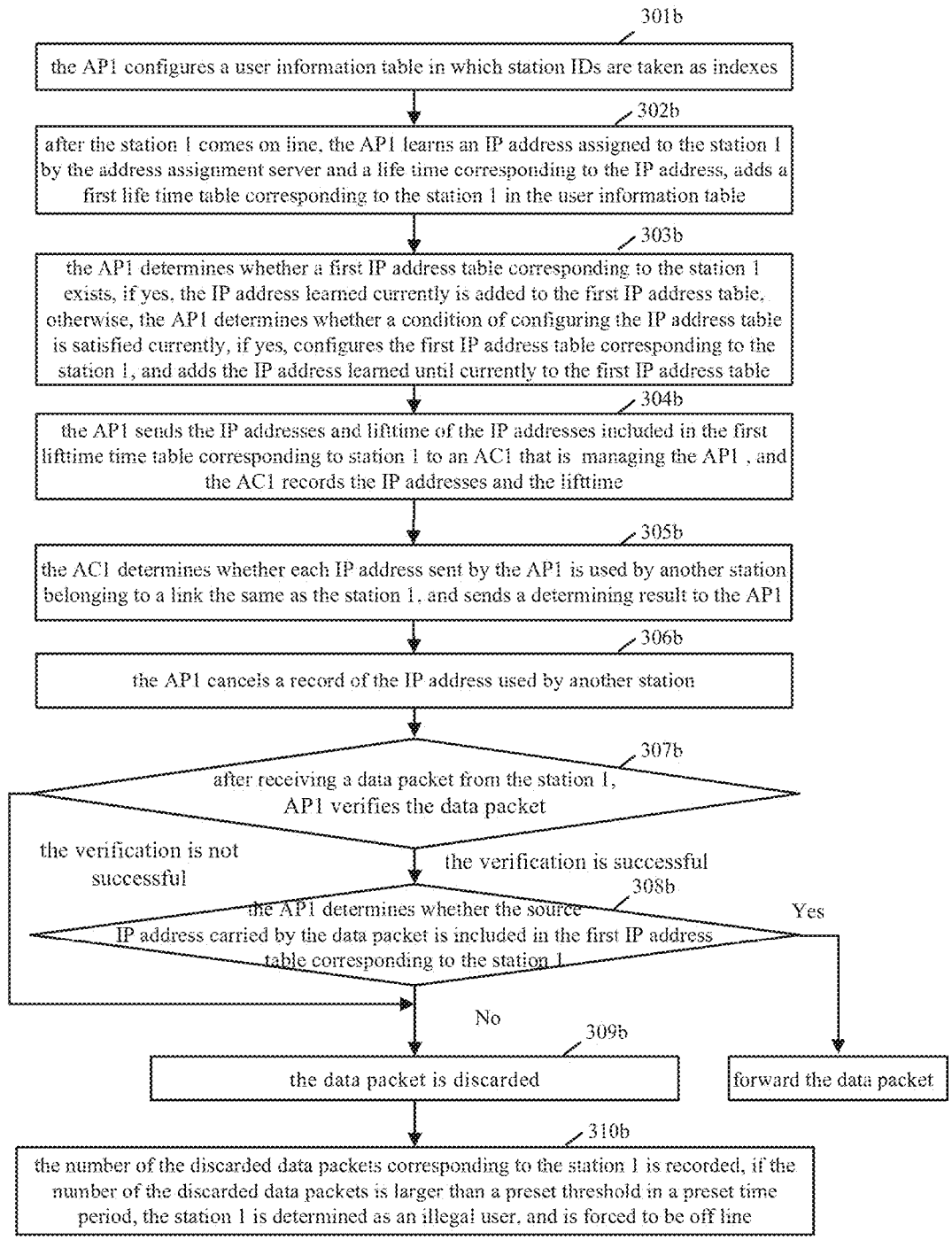
FIG. 3b is a specific flowchart illustrating an example of the principles disclosed herein.

In Ethernet, the same link may refer to the same Virtual Local Area Network (VLAN). Generally, in Ethernet communication, the stations in the same VLAN are to perform communication using different IP addresses. The procedure shown in FIG. 3b is mainly to avoid having different stations in the same link perform communications using the same IP address. Other solutions, such as to prevent different stations in different links from communicating using the same IP address, can be achieved using the same principles.

FIG. 3b is a flowchart illustrating one possible example. The procedure shown in FIG. 3b is based on the networking shown in FIG. 1. The DHCPv6 address assignment mode is taken as an example, and processes for other address assignment modes are similar.

In FIG. 1, each AP is configured to allow the transmission of DHCP v6 packets and ND (Neighbor Discover) packets of link local addresses. The link local address is used by the station to access a local area network or limited resources in the network before authentication for the station is finished. After passing the authentication, the station can access external networks by using an address assigned successfully.

The specific procedure shown in FIG. 3b is described in detail below. In this example, the station is the station 1 from FIG. 1, and the AP which the station accesses is AP1, also shown in FIG. 1.

In block 301b, AP1 firstly configures a user information table in which station IDs are taken as indexes. The user information table includes the station IDs of stations accessing the network through AP1 and user information corresponding to the stations.

The user information table is similar to a conventional user information table. The station ID may be, for example, a MAC address of the station or a user name of the station. In the following, the MAC address of the station is taken as the station ID, referring to the user information table shown in FIG. 4a. The user information in the user information table may include an ID of AP1 and an ID of an AC managing AP1, etc.

In block 302b, after the station 1 comes on line, AP1 snoops on DHCPv6 packets or Neighbor Discovery (ND) packets transmitted between station 1 and an address assignment server to learn an IP address assigned to station 1 by the address assignment server and a life time corresponding to the IP address according to the packets snooped. AP1 then adds a first lifetime table corresponding to the station 1 in the user information table. The first lifetime table includes a relation between the IP addresses assigned to station 1 and extended fields. The extended fields include the lifetime of the IP address. The life time of the IP address is also called a lease time in DHCPv6 interaction procedure.

In block 302b, the user information table is extended by adding the first lifetime table. There is no lifetime table in a conventional user information table.

In the example, the extended field may further include other information such as state information of the IP address. Usually, if a certain IP address is assigned to station 1 by the address assignment server, the state information of the IP address is ready. Otherwise, the state information is another state identifier. Hence, the state information corresponding to each IP address included in the extended field is ready. In the example, the MAC address of station 1 is represented as MAC1. The added first lifetime table is shown in FIG. 4b.

It should be noted that the first lifetime table established in block 302b is to make it convenient for AP1 to periodically check whether the lifetime of the IP address expires. Thus, the relation between the IP addresses and extended fields may be arranged in the first lifetime table according to the length of the lifetime of the IP addresses.

In block 303b, AP1 determines whether a first IP address table corresponding to station 1 exists. If the first IP address table corresponding to station 1 exists, the IP address learned currently is added to the first IP address table. Otherwise, AP1 keeps determining whether a condition of configuring the IP address table is currently satisfied. If the condition of configuring the IP address table is satisfied currently, AP1 configures the first IP address table corresponding to station 1 and adds the IP address learned to the first IP address table.

In block 303b, determining whether a condition of configuring the IP address table is currently satisfied includes, for example, determining whether the number of IP addresses learned by AP1 in block 302b is equal to, or larger than, a first designated value. Determining whether a condition of configuring the IP address table is currently satisfied may also include, for example, determining whether the number of IP addresses learned by AP1 before block 303b is equal to, or larger than, a second designated value.

As can be seen from block 303b, the first IP address table includes only the IP address assigned to station 1. The first IP address table does not include the lifetime of the IP address.

In block 303b, the first IP address table corresponding to the station 1 is to verify the data packet, as shown in FIG. 307b. The IP addresses included in the independent first IP address table may be arranged according to a principle for fast locating the IP address, for example, according to HASH algorithm or Radix tree organization. The first IP address table is not necessary, and only provided for fast search.

Block 304b, AP1 sends the IP addresses and lifetime of the IP addresses included in the first lifetime table corresponding to the station 1 to an AC that is managing AP1 (called as AC1), and AC1 records the IP addresses and the lifetime in a second lifetime table.

The lifetime is sent to AC1 to synchronize the lifetime in AP1 with that in AC1. Consequently, an AP to which station 1 roams can check whether the lifetime of the IP address expires. In practical applications, if the station does not roam, it is not needed to synchronize the lifetime and only the IP addresses are learned. Correspondingly, in block 302b, the lifetime is not learned and is not recorded in the first lifetime table. Because the first lifetime table does not then include the lifetime, it is ensured that the first lifetime table can be fast searched when the data packet is verified. Therefore, when the data packet is received subsequently, the source IP address carried in the data packet may be verified by using the first lifetime table, and it is not needed to perform block 303b.

In block 305b, AC1 determines whether each IP address sent by AP1 is used by another station belonging to a link that is the same as that of station 1. AC1 then sends a determining result to AP1.

In AC1, a second IP address table corresponding to the link to which the station 1 belongs is preconfigured. The second IP address table includes IP addresses of all the stations belonging to the link of the station 1. Specifically, in block 305b, the second IP address table is searched for the IP address. If the IP address is not found, AC1 determines that the IP address is not used by another station belonging to the same link as station 1, and the IP address is indicated as an IP address not used by another station. If the IP address is found, AC1 determines that the IP address is used by another station belonging to the same link as station 1, and the IP address is indicated as an IP address used by another station. In the Ethernet, the other station belonging to the same link as station 1 is a station located on the same VLAN as station 1. In some examples, in block 305*b*, AC1 may further add the IP address not used by another station to a second IP address table corresponding to the link to which station 1 belongs.

The IP addresses included in the second IP address table may be arranged according to a principle for quickly locating the IP address. For example, the IP addresses included in the second IP address table may be arranged according to HASH algorithm or Radix tree organization.

After blocks 304*b* and 305*b*, AC1 records each IP address not used by another station and the lifetime of each such IP address. In another example, in block 304*b*, the IP address and the lifetime of the IP address sent by AP1 may not be recorded in the second lifetime table. In this example, in block 305*b*, only the IP addresses not in use by another station and the lifetime of each such IP address are recorded in the second lifetime table.

In block 306*b*, AP1 cancels a record of the IP address used by another station.

Specifically, in block 306*b*, AP1 cancels the IP address used by another station from the first IP address table and the lifetime of the IP address from the first lifetime table. Both the first lifetime table and the first IP address table do not then include the IP address used by another station.

After blocks 302*b* and 306*b*, AP1 records the IP address not used by another station in the first IP address table and records the IP address not used by another station and the lifetime of the IP address not used by another station in the first lifetime table. As can be seen from blocks 302*b* to 306*b*, in the examples, the learned IP address and lifetime are recorded in the first lifetime table, the learned IP address is recorded in the first IP address table, and the record of the IP address used by another station is cancelled according to the determination by AC1. In another example, the learned IP address and lifetime may be not recorded in the first lifetime table, the learned IP address may be not recorded in the first IP address table, only the IP address not used by another station is recorded in the first IP address table (similar to the block 303*b*), and the IP address not used by another station and the lifetime of the IP address not used by another station are recorded in the first lifetime table.

It should be noted that, in the example, AP1 periodically checks whether the lifetime of each IP address in the first lifetime table corresponding to station 1 expires. If the lifetime of a certain IP address expires, AP1 cancels the record of that IP address and notifies AC1, so that AC1 may cancel the record of that IP address.

In an example, AP1 cancels the record of the IP address by cancelling the expired lifetime and the IP address corresponding to the expired lifetime from the first lifetime table. In this example, AP1 also cancels the IP address corresponding to the expired lifetime from the first IP address table corresponding to station 1.

In an example, AC1 cancels the record of the IP address as follows. If AC1 recorded the IP address and lifetime sent by AP1 in the second lifetime table corresponding to station 1, after receiving the notification of the expired lifetime, AC1 cancels the expired lifetime and the IP address corresponding to the expired lifetime from the second lifetime table. AC1 then cancels the IP address corresponding to the expired lifetime from the second IP address table.

In block 307*b*, after receiving a data packet from station 1, AP1 verifies the data packet by using the 802.11I protocol and an MAC address of station 1 included in the user information table. If the verification is successful, block 308*b* is performed. Otherwise, block 309*b* is performed.

In block 308*b*, AP1 determines whether the source IP address carried by the data packet is included in the first IP address table corresponding to station 1. If the source IP address carried by the data packet is included in the first IP address table corresponding to station 1, AP1 forwards the data packet. Otherwise, block 309*b* is performed.

In block 309*b*, the data packet is discarded and block 310*b* is performed.

In block 310*b*, the number of the discarded data packets corresponding to station 1 is recorded. AP1 determines whether the number of the discarded data packets corresponding to station 1 is larger than a preset threshold in a preset time period. If the number of the discarded data packets corresponding to station 1 is larger than the preset threshold in a preset time period, station 1 is determined as an illegal user and is forced off line and excluded from the network.

In the procedure shown in FIG. 3*b*, when snooping for the IP address assigned to station 1 indicates that the IP address of station 1 has changed, AP 1 updates the changed IP address and notifies AC1 that is managing AP1 to update the changed IP address.

Specifically, the IP address change includes that the previous IP address is released or the like. For example, when the IP address is released, AP1 cancels the record of the released IP address and notifies AC1 that is managing AP1, and AC1 cancels the record of the released IP address.

AP1 cancels the record of the released IP address canceling the released IP address and the lifetime of the released IP address from the first lifetime table corresponding to station 1. AP1 also cancels the released IP address from the first IP address table corresponding to station 1.

AC1 cancels the record of the released IP address by canceling the released IP address and the lifetime of the released IP address from the second lifetime table including the IP address and lifetime sent by AP1. AC1 also cancels the released IP address from the second IP address table corresponding to the link of station 1.

When snooping indicates that the lifetime of the IP address assigned to station 1 has changed, AP1 updates the lifetime of the IP address and notifies AC1 that is managing AP1 to update the lifetime of the IP address. For example, when the lifetime is updated, AP1 updates the lifetime in the first lifetime table corresponding to station 1 and notifies AC1 that is managing AP1 of the update. Accordingly, AC1 updates the lifetime in the second lifetime table including the IP address and lifetime sent by AP1.

In addition, in this example, all the ACs may send the IP address and lifetime sent by the AP managed by the AC to other ACs periodically or when the IP address or lifetime recorded by the AC changes. The other ACs perform the above operations as the original AC does.

Figures 3C, 4A:
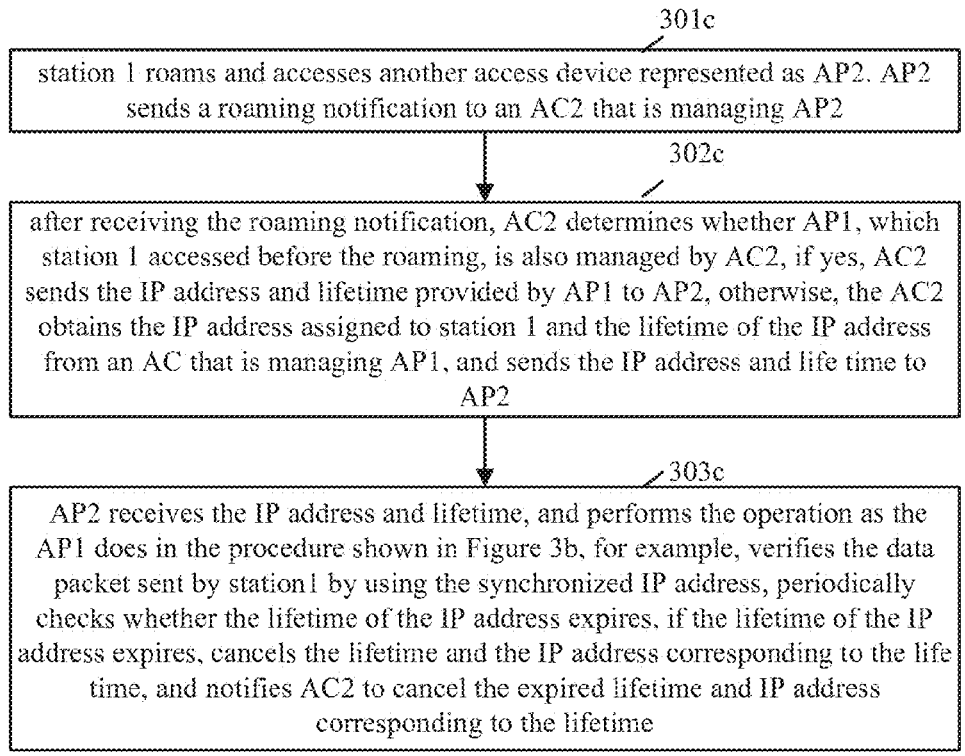

In addition, an example also provides the process of a roaming station, which is shown in FIG. 3*c*.

Referring to FIG. 3*c*, FIG. 3*c* is a flowchart illustrating roaming of a station in one possible example of the principles disclosed herein. In this example, the AP which station 1 accessed before roaming is AP1. The procedure includes the following blocks, as shown in FIG. 3*c*.

In block 301*c*, station 1 roams and accesses another access device represented as AP2. AP2 sends a roaming notification to an AC2 that is managing AP2.

In block 302*c*, after receiving the roaming notification, AC2 determines whether AP1, which station 1 accessed before roaming, is also managed by AC2. If AP1 so, AC2 sends an IP address and lifetime for station 1 provided by AP1 to AP2. Otherwise, AC2 obtains the IP address assigned to station 1 and the lifetime of the IP address from an AC that is managing AP1. AC2 then sends the IP address and lifetime to AP2.

In the example, information for the APs may be periodically shared by the ACs that manage the APs. This information for the APs includes the ID of the AP and the stations accessing that AP. Therefore, in block 302c, AC2 may easily identify the AC that is managing AP1 according to the shared information.

In block 302c, the process by which AC2 sends the IP address and lifetime obtained from the AC that is managing AP1 to AP2 includes: recording the IP address and lifetime obtained from the AC that is managing AP1; for each IP address, searching a established second IP address table corresponding to a link to which station 1 belongs for the IP address; if the IP address is not found, directly adding the IP address to the second IP address table; if the IP address is found, cancelling the IP address and the lifetime of the IP address from the recorded IP address and lifetime table; after the above operation is performed for each IP address, sending the remaining IP address and lifetime to AP2.

In block 303c, AP2 receives the synchronized IP address and lifetime and performs the operation as AP1 does in the procedure shown in FIG. 3b. For example, AP2 verifies a data packet sent by station 1 by using the synchronized IP address; periodically checks whether the lifetime of the IP address expires; if the lifetime of the IP address expires, cancels the lifetime and the IP address corresponding to the station; and notifies AC2 to cancel the expired lifetime and IP address corresponding to the station.

Figure 5:
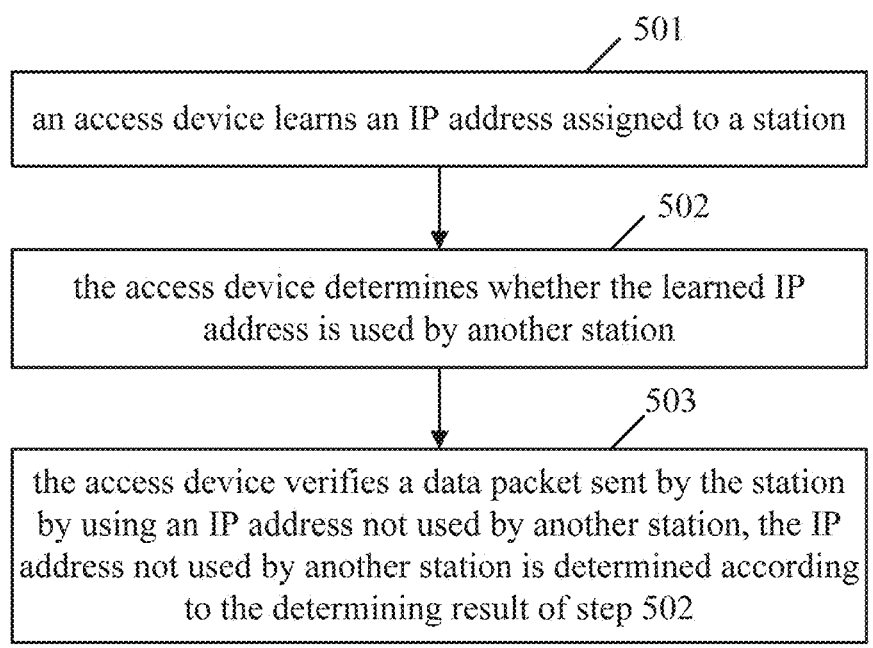
FIG. 5 is a basic flowchart illustrating another example of the principles disclosed herein.

FIG. 5 is a basic flowchart illustrating another example of the principles disclosed herein. The procedure shown in FIG. 5 is mainly to avoid having different stations in the same link perform communications by using the same IP addresses. The same principles may also be used to avoid having different stations in different links perform communication by using the same IP addresses.

As shown in FIG. 5, the procedure includes the following blocks.

In block 501, an access device learns an IP address assigned to a station.

In Block 502, the access device determines whether the learned IP address is used by another station.

In block 503, the access device verifies a data packet sent by the station by using an IP address that is not used by another station. The IP address not used by another station is determined according to the result of block 502.

In the procedure shown in FIG. 5, the access device may be a FAT AP which has the functions of the access device (e.g., Access Point) and the managing device (e.g., Access Controller) in the above examples. The FAT AP is taken as an example to describe the procedure shown in FIG. 5 in detail.

Figure 6:
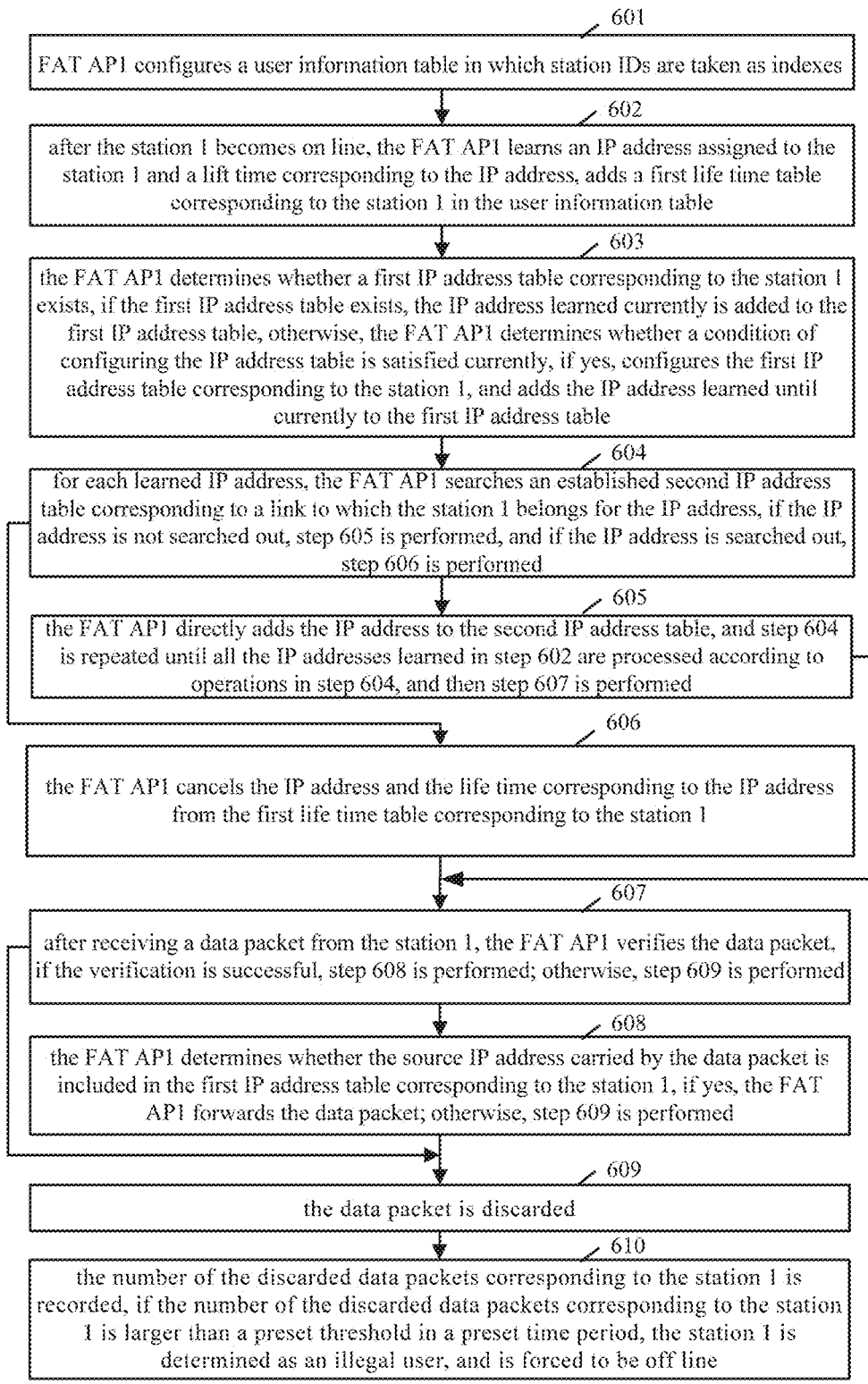
FIG. 6 is a specific flowchart illustrating another example of the principles disclosed herein.

FIG. 6 is a specific flowchart illustrating another example. In the example shown in FIG. 6, the DHCPv6 address assignment mode is taken as an example. Processes for other address assignment modes are similar. In FIG. 6, each station controlled by the FAT AP is configured to allow the transmission of DHCP v6 packets and ND packets of link local addresses.

In this example, the station is the station 1, and the AP supporting network access for the station is AP1. The specific procedure shown in FIG. 6 is described in detail hereinafter.

Blocks 601 to 603 are similar to blocks 301b to 303b respectively. The difference includes that AP1 in blocks 301b to 303b is replaced by the FAT AP1 in blocks 601 to 603.

In block 604, for each learned IP address, the FAT AP1 searches an established second IP address table corresponding to a link to which the station 1 belongs for the IP address. If the IP address is not found, block 605 is performed, and if the IP address is found, block 606 is performed.

In block 604, it is determined whether the IP address is used by another station belonging to the same link as station 1.

In block 605, the FAT AP1 directly adds the IP address to the second IP address table.

Block 604 is repeated until all the IP addresses learned in block 602 are processed according to operations in block 604. Then, block 607 is performed.

In block 606, the FAT AP1 cancels the IP address and the lifetime corresponding to the IP address from the first lifetime table corresponding to station 1.

Blocks 607 to 610 are similar to blocks 307b to 310b respectively. The difference includes that AP1 in blocks 307b to 310b is replaced by the FAT AP1 in blocks 607 to 610.

In addition, the process of roaming for station 1 is, by way of example, similar to that shown in FIG. 3c. The procedure includes that: when roaming, station 1 accesses another FAT AP represented as FAT AP2 that is different from FAT AP1. FAT AP2 obtains the IP address assigned to station 1 and the lifetime of the IP address from FAT AP1. FAT AP2 receives the IP address and lifetime sent by FAT AP1 and performs the operation as the FAT AP1 does. For example, FAT AP2 verifies the data packet sent by station 1 by using the received IP address; periodically checks whether the lifetime of the IP address expires; if the lifetime of the IP address expires, cancels the lifetime and the IP address corresponding to the station.

In the example, each of the FAT APs may send the IP address and lifetime corresponding to the station managed by the FAT AP to other FAT APs periodically or when the IP address or lifetime recorded by the FAT AP changes. The other FAT APs perform the operations in the block 604.

Figure 7:
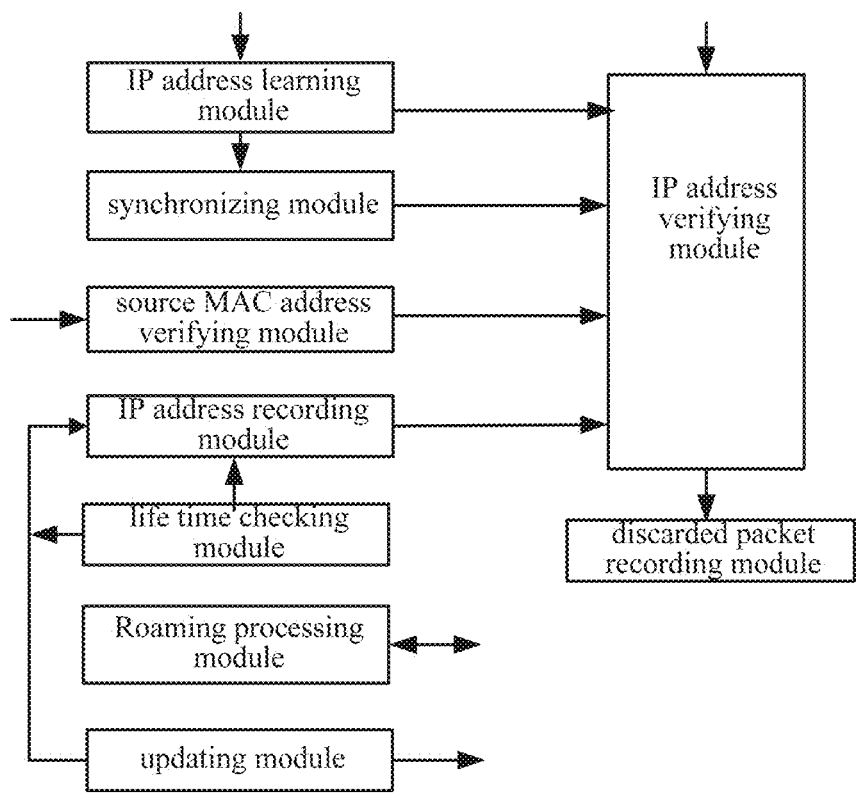
FIG. 7 is a schematic diagram illustrating a structure of an apparatus in accordance with another example of the principles disclosed herein.

FIG. 7 is a schematic diagram illustrating a structure of an apparatus in accordance with another example. The apparatus may be used as the access device in the method of FIG. 2. The apparatus includes:

an IP address learning module to learn an IP address assigned to a station;

a synchronizing module to send the learned IP address to a managing device that is managing the access device, and receive a determining result of whether the IP address is used by another station from the managing device; and an IP address verifying module to verify a data packet sent by the station by using an IP address not used by another station, the IP address not used by another station being determined according to the determination from the managing device.

As shown in FIG. 7, the access device further includes:

a source MAC address verifying module to perform source MAC address verification for the data packet.

The IP address verifying module performs the verification for the data packet after the data packet has passed the source MAC address verification.

As shown in FIG. 7, the access device further includes: an IP address recording module to record the IP address not used by another station in a first IP address table corresponding to the station before the IP address verifying module performs the verification. Accordingly, the IP address verifying module to determine whether a source IP address carried by the data packet sent by the station is included in the first IP address table, forward the data packet if the source IP address is included in the first IP address table, and, otherwise, not forward the data packet.

The IP address recording module further to discard the data packet that is not approved for forwarding.

As shown in FIG. 7, the access device further includes:

a discarded packet recording module to record the number of discarded data packets corresponding to the station, determine whether the number of discarded data packets is larger than a preset threshold in a preset time period, and determine that the station as a illegal user if the number of discarded data packets is larger than the preset threshold in the preset time period.

In addition, the IP address learning module further functions to learn the lifetime corresponding to the IP address assigned to the station. Accordingly, the IP address recording module further functions to record the IP address not used by another station and the lifetime corresponding to that IP address in a first lifetime table.

As shown in FIG. 7, the access device further includes:

a lifetime checking module to periodically check whether the lifetime in the first lifetime table expires, cancel a record of the IP address corresponding to the expired lifetime, and notify the managing device.

In the example, the synchronizing module further to send the lifetime corresponding to the IP address to the managing device.

As shown in FIG. 7, the access device further includes a roaming processing module. The roaming processing module is to send a roaming notification to the managing device when a roaming station accesses the access device. The roaming processing module is also to receive and record an IP address assigned to the roaming station and lifetime corresponding to the IP address.

As shown in FIG. 7, the access device further includes:

an updating module that, when snooping for the IP address of the station accessing the access device changes, updates the IP address of the station and notifies the managing device. When snooping for the lifetime corresponding to the IP address of the station accessing to access device changes, the updating module updates the lifetime corresponding to the IP address of the station accessing the access device and notifies the managing device.

Figure 8:
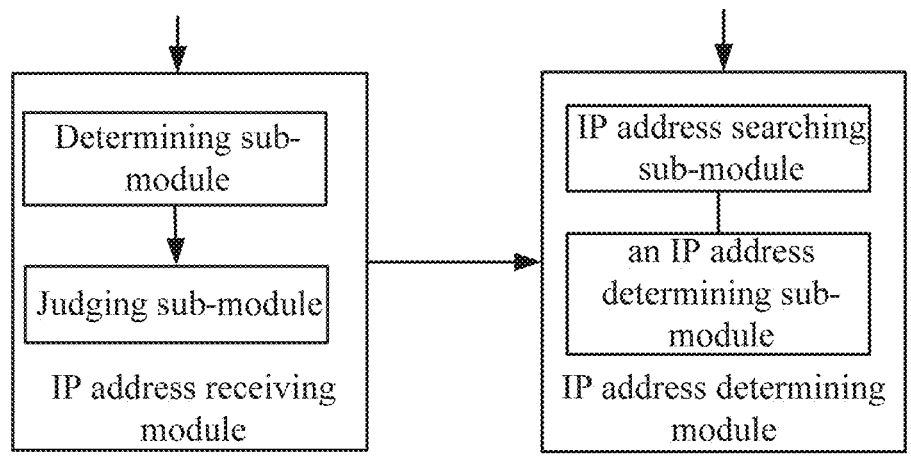
FIG. 8 is a schematic diagram illustrating a structure of an apparatus in accordance with another example of the principles disclosed herein.

FIG. 8 is a schematic diagram illustrating a structure of another apparatus in accordance with another example. The apparatus illustrated may be used as the managing device in the method shown in FIG. 2. As shown in FIG. 8, the apparatus includes:

an IP address receiving module to receive an IP address of a station sent by an access device managed by the managing device; and an IP address determining module to determine whether the IP address is used by another station and send a determination to the access device.

The IP address receiving module further to receive a lifetime corresponding to the IP address sent by the access device. The IP address determining module then records the IP address and the lifetime corresponding to the IP address in a second lifetime table corresponding to the station when it is determined that the IP address is not used by another station.

In the example, the other station and the original station may belong to the same link. Accordingly, the IP address determining module is to determine whether the IP address is used by another station belonging to the same link as the original station by using the following sub-modules as shown in FIG. 8.

An IP address searching sub-module is to search an established second IP address table corresponding to the link to which the station belongs for the IP address.

An IP address determining sub-module is to determine the IP address found by the IP address searching sub-module as the IP address used by another station belonging to the same link as the original station, determine an IP address not found by the IP address searching sub-module to be an IP address not used by another station belonging to the same link as the original station, and add the IP address not used by another to the second IP address table.

In the example, the IP address receiving module further to receive the IP address corresponding to an expired lifetime notified by the access device, cancel a record of the IP address corresponding to the expired lifetime, receive a roaming notification sent by the access device, and send an IP address assigned to a roaming station accessing the access device and the lifetime corresponding to the IP address assigned to the roaming station to the access device.

The IP address receiving module sends an IP address assigned to the roaming station accessing the access device and the lifetime corresponding to the IP address to the access device by using the following sub-modules as shown in FIG. 8.

A determining sub-module is to determine an access device which the roaming station accessed originally before roaming.

A judging sub-module is to judge whether the access device determined by the determining sub-module is managed by the managing device. If the access device determined by the determining sub-module is managed by the managing device, the module obtains the IP address and lifetime of the roaming station from a recorded IP addresses and lifetime. Otherwise, the module determines a managing device that is managing the access device and receives the IP address and lifetime of the roaming station from the managing device that is managing the original access device.

Figure 9:
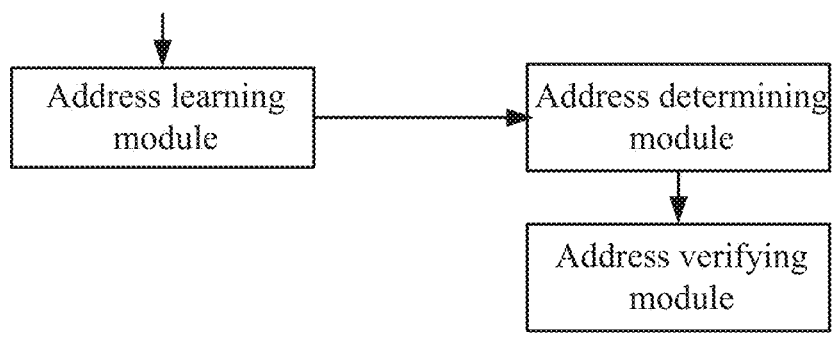
FIG. 9 is a schematic diagram illustrating a structure of an apparatus in accordance with another example of the principles disclosed herein.

FIG. 9 is a schematic diagram illustrating a structure of another apparatus in accordance with another example. For example, the apparatus may be the access device in the method shown in FIG. 5. As shown in FIG. 9, the apparatus includes:

an address learning module to learn an IP address assigned to a station;

an address determining module to determine whether the learned IP address is used by another station; and an address verifying module to verify a data packet sent by the station by using an IP address not used by another station. That the IP address is not used by another station is determined according to a result of the operation of the address determining module.

In the example, the station and the other station belong to the same link.

In practical applications, the access device shown in FIG. 9 has all the functions of the access device shown in FIG. 7 and all the functions of the managing device shown in FIG. 8.

As can be seen from the above examples, the access device, after learning and recording the IP address assigned to a certain station, determines whether the assigned IP address is used by another station belonging to the same link as the station. If the assigned IP address is used by another station belonging to the same link as the station, the IP address is cancelled from the recorded list of IP addresses. Otherwise, the IP address is not cancelled. In this way, the access device can record the IP address of the station that is not used by another station belonging to the same link and verify a data packet from that station by using the recorded IP address. When the data packet passes the verification, the network sends the data packet. Otherwise, the data packet is declined, so that the IP address verification is performed for the data packet sent by the station. Consequently, we avoid different stations use the same IP address to perform communication at the same time and promote network security.

Various methods, devices and modules and sub-modules of devices have been described above. The methods may be implemented on the hardware devices, such an access point, access controller etc. The methods, modules and sub-modules may be implemented together by a single logic circuit, ASICs etc, distributed among several logic circuits, ASICs etc, implemented by machine readable instructions stored in a memory and executable by a processor or a combination of the above approaches.

The preceding description has been presented only to illustrate and describe examples of the principles described herein. This description is not intended to be exhaustive or to limit these principles to any precise form disclosed. Many modifications and variations are possible in light of the above teaching.

The invention claimed is:

1. A verification method to be applied in a Wireless Local Area Network (WLAN), comprising:
    learning, by an access device, an Internet Protocol (IP) address assigned to a station;
    sending the IP address to a managing device that is managing the access device;
    receiving, from the managing device, a determination of whether the IP address is used by another station;
    in response to the determination from the managing device indicating that the IP address is not used by another station, recording, by the access device, the IP address in a first IP address table corresponding to the station;
    receiving a data packet from the station; and
    verifying, by the access device, whether to forward the data packet sent by the station by determining whether a source IP address carried in the data packet is included in the first IP address table.

2. The method of claim 1, further comprising:
    performing a source Media Access Control (MAC) address verification; and
    wherein verifying whether to forward the data packet sent by the station, further comprises verifying whether to forward the data packet after the data packet passes the MAC address verification.

3. The method of claim 1, wherein the another station and the station belong to the same link.

4. The method of claim 1, further comprising:
    forwarding the data packet in response to the source IP address being included in the first IP address table; and
    not forwarding the data packet in response to the source IP address not being included in the first IP address table.

5. The method of claim 4, further comprising:
    in response to the source IP address not being included in the first IP table:
        discarding the data packet;
        recording a number of discarded data packets corresponding to the station;
        determining whether the number of the discarded data packets corresponding to the station is larger than a preset threshold in a preset time period, and
        in response to the number of the discarded data packets corresponding to the station being larger than the preset threshold in the preset time period, identifying the station as an illegal user.

6. The method of claim 1, wherein recording the IP address in the first IP address table corresponding to the station comprises:
    determining whether the first IP address table corresponding to the station exists;
    in response to a determination that the first IP address table corresponding to the station exists, recording the IP address not used by another station in the first IP address table corresponding to the station; and
    in response to a determination that the first IP address table corresponding to the station does not exist, generating the first IP address table corresponding to the station, and recording the IP address in the generated first IP address table corresponding to the station.

7. The method of claim 1, further comprising:
    learning, by the access device, a lifetime corresponding to the IP address assigned to the station;
    recording the IP address and the lifetime corresponding to the IP address in a first lifetime table corresponding to the station;
    periodically checking whether the lifetime in the first lifetime table has expired; and
    in response to a determination that the lifetime in the first lifetime table has expired, cancelling a record of the IP address corresponding to the expired lifetime in the first lifetime table, and notifying the managing device.

8. An access device to be applied in a Wireless Local Area Network (WLAN), comprising:
    an Internet Protocol (IP) address learning logic circuit to learn an IP address assigned to a station;
    a synchronizing logic circuit to send the IP address to a managing device that is managing the access device and receive a determination of whether the IP address is used by another station from the managing device;
    an IP address recording logic circuit to, in response to the determination from the managing device indicating that the IP address is not used by another station, record the IP address in a first IP address table corresponding to the station; and
    an IP address verifying logic circuit to receive a data packet from the station and to verify whether to forward the data packet sent by the station based upon whether a source IP address carried in the data packet is included in the first IP address table.

9. The access device of claim 8, further comprising:
    a source Media Access Control (MAC) address verifying logic circuit to perform source MAC address verification for the data packet, wherein
    the IP address verifying logic circuit is to verify the data packet after the data packet has passed the source MAC address verification.

10. The access device of claim 8,
    wherein the IP address recording logic circuit is to forward the data packet in response to the source IP address being included in the first IP address table; and
    wherein the IP address recording logic circuit is to not forward the data packet in response to the source IP address not being included in the first IP address table.

11. The access device of claim 10, wherein
the IP address verifying logic circuit is further to discard the data packet in response to the source IP address not being included in the first IP table; and
the access device further comprises:
a discarded packet recording logic circuit to record the number of discarded data packets corresponding to the station, determine whether the number of the discarded data packets is larger than a preset threshold in a preset time period, and determine that the station is an illegal user in response to a determination that the number of discarded data packets is larger than the preset threshold in the preset time period.

12. The access device of claim 8, wherein the IP address learning logic circuit is further to learn a lifetime corresponding to the IP address assigned to the station;
the IP address recording logic circuit is further to record the IP address and the lifetime corresponding to the IP address in a first lifetime table; and
the access device further comprises:
a lifetime checking logic circuit to periodically check whether the lifetime in the first lifetime table expires, and in response to a determination that the lifetime in the first lifetime table has expired, cancel a record of the IP address corresponding to an expired lifetime in the first lifetime table, and notify the managing device of the expired lifetime.

13. The access device of claim 12, wherein:
the synchronizing logic circuit is further to send the lifetime corresponding to the IP address to the managing device; and
the access device further comprises:
a roaming processing logic circuit to send a roaming notification to the managing device when a roaming station accesses the access device, and to receive and record an IP address assigned to the roaming station and a lifetime corresponding to the IP address assigned to the roaming station.

14. The access device of claim 8, further comprising:
an updating logic circuit to update the IP address of the station and notify the managing device when snooping for the IP address of the station indicates that the IP address of the station has changed.

15. A non-transitory computer readable storage medium on which is stored machine readable instructions that when executed by a processor cause the processor to:
learn an Internet Protocol (IP) address assigned to a station;
determine whether the IP address is used by another station;
in response to a determination that the IP address is not used by another station, record the IP address in a first IP address table corresponding to the station;
in response to a determination that the IP address is used by another station, cancel a record of the IP address as being associated with the station;
receive a data packet having a source IP address from the station; and
determine whether to forward the data packet sent by the station based upon whether the source IP address of the data packet is included in the first IP address table.

16. The non-transitory computer readable storage medium of claim 15, wherein the machine readable instructions are further to cause the processor to:
perform a source Media Access Control (MAC) address verification; and
to determine whether to forward the data packet sent by the station after the data packet passes the MAC address verification.

17. The non-transitory computer readable storage medium of claim 15, wherein the machine readable instructions are further to cause the processor to:
forward the data packet in response to the source IP address being included in the first IP address table; and
not forwarding the data packet in response to the source IP address not being included in the first IP address table.

18. The non-transitory computer readable storage medium of claim 17, wherein the machine readable instructions are further to cause the processor to:
in response to the source IP address not being included in the first IP table:
discard the data packet;
record a number of discarded data packets corresponding to the station;
determine whether the number of the discarded data packets corresponding to the station is larger than a preset threshold in a preset time period, and
in response to the number of the discarded data packets corresponding to the station being larger than the preset threshold in the preset time period, identify the station as an illegal user.

19. The non-transitory computer readable storage medium of claim 15, wherein to record the IP address in the first IP address table corresponding to the station, the machine readable instructions are further to cause the processor to:
determine whether the first IP address table corresponding to the station exists;
in response to a determination that the first IP address table corresponding to the station exists, record the IP address not used by another station in the first IP address table corresponding to the station; and
in response to a determination that the first IP address table corresponding to the station does not exist, generate the first IP address table corresponding to the station, and recording the IP address in the generated first IP address table corresponding to the station.

20. The non-transitory computer readable storage medium of claim 15, wherein the machine readable instructions are further to cause the processor to:
learn a lifetime corresponding to the IP address assigned to the station;
record the IP address and the lifetime corresponding to the IP address in a first lifetime table corresponding to the station;
periodically check whether the lifetime in the first lifetime table has expired; and
in response to a determination that the lifetime in the first lifetime table has expired, cancel a record of the IP address corresponding to the expired lifetime in the first lifetime table, and notifying the managing device.

* * * * *